US012809968B2

(12) United States Patent
Gauthier et al.

(10) Patent No.: US 12,809,968 B2
(45) Date of Patent: Nov. 24, 2026

(54) ATTACK DETECTION WITH APPLICATION-AWARE SYSTEM CALL ANALYSIS

(71) Applicant: Oracle International Corporation, Redwood Shores, CA (US)

(72) Inventors: Francois Gauthier, Brisbane (AU); Robert Francis, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 18/798,642

(22) Filed: Aug. 8, 2024

(65) Prior Publication Data

US 2026/0044595 A1 Feb. 12, 2026

(51) Int. Cl.
*G06F 21/54* (2013.01)

(52) U.S. Cl.
CPC ........ *G06F 21/54* (2013.01); *G06F 2221/033* (2013.01)

(58) Field of Classification Search
None
See application file for complete search history.

(56) References Cited

U.S. PATENT DOCUMENTS 10,033,759 B1 * 7/2018 Kabra .................. G06F 21/629
2004/0205474 A1 * 10/2004 Eskin .................. H04L 63/1416 713/188
2024/0380761 A1 * 11/2024 Wang .................. H04L 63/1416

OTHER PUBLICATIONS

Christopher Kruegel, Darren Mutz, Fredrik Valeur, and Giovanni Vigna. "On the detection of anomalous system call arguments". In European Symposium on Research in Computer Security, Springer, Jan. 1, 2003, 18 pages.

Federico Maggi, Matteo Matteucci, and Stefano Zanero. "Detecting intrusions through system call sequence and argument analysis". IEEE Transactions on Dependable and Secure Computing, Nov. 5, 2008, 15 pages.

OWASP, "OWSAP Top Ten", https://owasp.org/www-project-top-ten/, accessed Aug. 8, 2024, 5 pages.

Sysdig, "Dig Deeper", https://github.com/draios/sysdig, accessed Aug. 8, 2024, 5 pages.

Pendleton, M., "System Call Anomaly Detection in Multi-Threaded Programs", Dissertation, Dec 1, 2017, 82 pages.

Liu, M. et al., "Host-Based Intrusion Detection System with System Calls: Review and Future Treads", Nov. 1, 2018, 36 pages.

Hu, J. et al., "A Simple and Efficient Hidden Markov Model Scheme for Host-Based Anomaly Intrusion Detection", Jan. 1, 2009, 6 pages.

* cited by examiner

*Primary Examiner* — Atta Khan
(74) *Attorney, Agent, or Firm* — Lathrop GPM LLP

(57) ABSTRACT

The operations include obtaining a system call stream from executing an instrumented program comprising an instrumented portion. The instrumented portion comprises instrumentation to add. The operations further include monitoring the system call stream for a start delimiter defined by instrumentation in the instrumented program, extracting a system call trace starting at the start delimiter, processing the system call trace through an attack model to obtain an attack probability, detecting an attack based on a comparison of the attack probability with an attack detection threshold, and generating an alert identifying the attack and the instrumented portion.

18 Claims, 11 Drawing Sheets

ATTACK DETECTION WITH APPLICATION-AWARE SYSTEM CALL ANALYSIS

BACKGROUND

Programs executing on computing systems can process millions of requests on behalf of users. When a program is accessible to users and other systems outside of a protected environment, the program may be subject to an attack. Namely, with the benign requests, malicious requests may also be processed. The malicious requests effectuate an attack against the program and the computing system executing the program. The attack may expose protected data, cause the computing system to be slow or unresponsive, and have other malicious effects.

The execution of a program that processes requests is performed at the user level of the computing system. The program may then make system call requests to the kernel of the operating system. Securing an application generally involves performing static or dynamic analysis of a program to detect vulnerabilities in the program. Completely independently of the static or dynamic analysis, anomaly detection on the system call requests to the kernel may be performed. The static or dynamic analysis may miss vulnerabilities that allows for attacks while analyzing just system call requests in a complicated program does not link to the sections of the program that caused the attack. Because of the difference between the user level and the kernel level, a challenge exists in identifying the attack and linking the attack to the portions of the program corresponding to the attack.

SUMMARY

In general, in one aspect, one or more embodiments relate to a method that includes obtaining a system call stream from executing an instrumented program includes an instrumented portion. The instrumented portion comprises instrumentation to add. The method further includes monitoring the system call stream for a start delimiter defined by instrumentation in the instrumented program, extracting a system call trace starting at the start delimiter, processing the system call trace through an attack model to obtain an attack probability, detecting an attack based on a comparison of the attack probability with an attack detection threshold, and generating an alert identifying the attack and the instrumented portion.

In general, in one aspect, one or more embodiments relate to a system that includes at least one processor and instructions executing on the at least one processor to cause the at least one processor to perform operations. The operations include obtaining a system call stream from executing an instrumented program including an instrumented portion. The instrumented portion comprises instrumentation to add. The operations further include monitoring the system call stream for a start delimiter defined by instrumentation in the instrumented program, extracting a system call trace starting at the start delimiter, processing the system call trace through an attack model to obtain an attack probability, detecting an attack based on a comparison of the attack probability with an attack detection threshold, and generating an alert identifying the attack and the instrumented portion.

In general, in one aspect, one or more embodiments relate to a non-transitory computer readable storage medium comprising computer readable program code for causing a computing system to perform operations. The operations include obtaining a system call stream from executing an instrumented program comprising an instrumented portion. The instrumented portion comprises instrumentation to add. The operations further include monitoring the system call stream for a start delimiter defined by instrumentation in the instrumented program, extracting a system call trace starting at the start delimiter, processing the system call trace through an attack model to obtain an attack probability, detecting an attack based on a comparison of the attack probability with an attack detection threshold, and generating an alert identifying the attack and the instrumented portion.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to identifying attacks using a program with system call analysis and linking the attacks to the corresponding portions of the program. To address the program of linking kernel level system call analysis to a user level program, one or more embodiments augment system call streams with application-level data through instrumenting the program. The instrumentation adds a system call to particular sections of the program causes a delimiter to be added to the system call stream that link the attack to the program. In one or more embodiments, the delimiter separates to system calls of portions of the program that are not of interest from system calls of targeted portions of the program that are of interest. In one or more embodiments, the delimiter augments the system call stream with information uniquely identifying portions of the program. For example, the delimiter itself may be a unique identifier or, when combined with other information, such as a thread identifier is a unique identifier.

Figure 1:
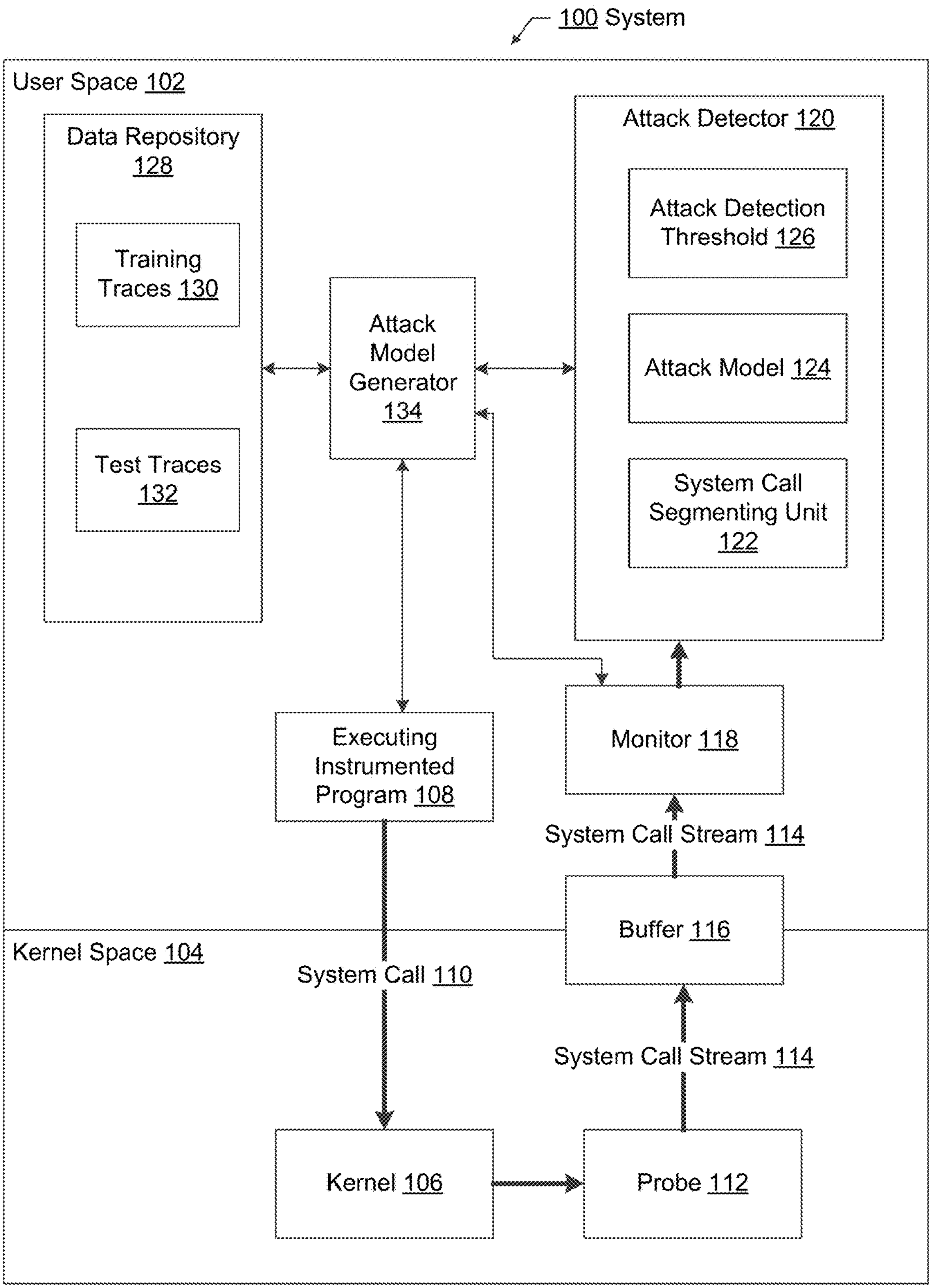
FIG. 1 shows a diagram of a system in accordance with one or more embodiments.

Turning to the figures, FIG. 1 shows a diagram of a system (100) in accordance with one or more embodiments. The system (100) may be or may execute on the computing system described below and in FIG. 7A and FIG. 7B. The system (100) may be a physical computing system, a virtual machine, a container, or other virtual environment. As shown in FIG. 1, the system includes user space (102) and kernel space (104). User space (102) and kernel space (104) refer to the standard definition used in the art of computing. For example, kernel space (104) may be strictly reserved for running a privileged operating system kernel (106), kernel extensions, and device drivers. In the virtual machine, the kernel space may be for the kernel within the virtual machine or on which the virtual machines execute. In contrast, user space (102) is the memory area where user level programs (e.g., executing instrumented program (108)) and some drivers execute.

Within the user space (102), an instrumented program (108) may execute. The instrumented program (108) is a target program for attack detection. Namely, the instrumented program (108) is a user level program that is written in any programming language and may process requests. In one or more embodiments, the instrumented program (108) may have source code of the program instrumented and then be compiled into a binary or object code for execution. Instrumentation are modifications to the source code or binary for tracking runtime behavioral information. The instrumentation may add instructions to the program. In the present application, the instrumentation adds delimiters to the system call stream that correspond to target portions in the program. For example, the target portions may be particular methods or routines of the program. A delimiter is a predefined code (e.g., numeric, alphabetic, or alphanumeric identifier) that separates different portions of the system call stream. The delimiter is a different sequence of characters than other sequences of characters that are not delimiters in the system call stream.

The executing target program (108) communicates with the kernel (106) using one or more system calls (110). A system call (110) as used herein corresponds to the standard definition used in the art. Specifically, the system call is a programmatic way in which a program requests a services of the operating system, including the kernel. Types of system calls include process control, file system requests, memory management, interprocess communication, and device management. For example, system calls include reads or writes to memory, opening, closing or appending to files, causing the system to perform a communication, and other operations. Software attacks rely on system call operations to effectuate the attack.

A probe (112) in the kernel space (104) is a benign process that is configured to monitor operations of the kernel (106). In one or more embodiments, the probe (112) is configured to generate a recordation of system call operations in a system call stream (114). In one or more embodiments, a system call stream (114) is a data stream listing system calls. The system call stream (114) is a recordation of the system calls that are made to the kernel (106). As such, the system calls are each recorded as metadata about the system call received by the kernel. For example, the system call stream may include the process identifier or thread identifier of the process or thread that generated the system call, the type of system call, and other such information.

A buffer (116) may be between the user space (102) and the kernel space (104). The buffer (116) is a temporary recording of the system call stream. The buffer may be a ring buffer. The buffer is a storage intermediary between the user space (102) and the kernel space (104). As such, the buffer (116) is accessible by both kernel level and user level processes. To protect kernel space (104), the buffer (116) is written to by kernel processes (e.g., probe (112)) and only read by user level process in one or more embodiments.

A monitor (118) is connected to the buffer. The monitor (118) is configured to obtain system call stream (114) from the buffer (116) and transmit the system call stream to an attack detector (120).

The attack detector (120) is software configured to detect attacks that use the executing instrumented program (108). The attack detector (120) may be configured to operate in real-time while the executing instrumented program is executing. In other embodiments, the attack detector (120) is configured to detect the attack after execution completes. In one or more embodiments, the attack detector (120) includes a system call segmenting unit (122), an attack model (124), and an attack detection threshold (126). The system call segmenting unit (122) is software configured to segment the system call based on a delimiters to generate traces. A trace is a series of system call identifiers. As such, the trace may be referred to as a system call trace. The trace may omit instructions that are not system call instructions.

An attack model (124) is a machine learning model that is configured to generate one or more probabilities of an attack based on the system calls in a trace. A probability is any number on a scale that is indicative a likelihood of an attack. A probability is not limited to a value between zero and one, but rather may use a different range. In one or more embodiments, the attack model is a Markov Chain model. In other embodiments, the attack model (124) is an artificial neural network. In one or more embodiments, the attack model (124) is specific to the instrumented program (108). In such a scenario, each executing instrumented program may have a corresponding attack model (124). In some embodiments, the attack model (124) may be generated for a target portion in the executing instrumented program. In such embodiments, each target portion in the executing instrumented program may have a corresponding attack model (124).

The attack detection threshold (126) is a threshold on the probability. If the attack detection threshold (126) is satisfied, then an attack is determined to occur. The attack detection threshold (126) may be a learned threshold that is specific to the attack model (124).

Continuing with FIG. 1, the user space (102) also includes a data repository (128). The data repository (128) is any type of storage unit and/or device (e.g., a file system, database, data structure, or any other storage mechanism) for storing data. Further, the data repository (128) may include multiple different, potentially heterogeneous, storage units and/or devices. The data repository (128) includes functionality to store training traces (130) and test traces (132). Training traces (130) are traces, as described above, for training the attack model (124). Test traces (132) are traces, as described above, for testing the attack model (124). Training traces (130) and test traces (132) are traces that are prelabeled and are known to be either from a benign execution or an attack execution. In some embodiments, training traces (130) and test traces (132) may be generated, for example, from only benign execution of the program (108).

The attack model generator (134) is software configured to generate an attack model (124) from the executing instrumented program (108). The processing of the attack model generator (134) is described in FIG. 2, FIG. 3, and FIG. 4.

While FIG. 1 shows a configuration of components, other configurations may be used without departing from the scope of the invention. For example, various components may be combined to create a single component. As another example, the functionality performed by a single component may be performed by two or More Components.

FIGS. 2, 3, 4, and 5 show flowcharts in accordance with one or more embodiments. While the various blocks in these flowcharts are presented and described sequentially, at least some of the blocks may be executed in different orders, may be combined or omitted, and at least some of the blocks may be executed in parallel. Furthermore, the blocks may be performed actively or passively.

Figure 2:
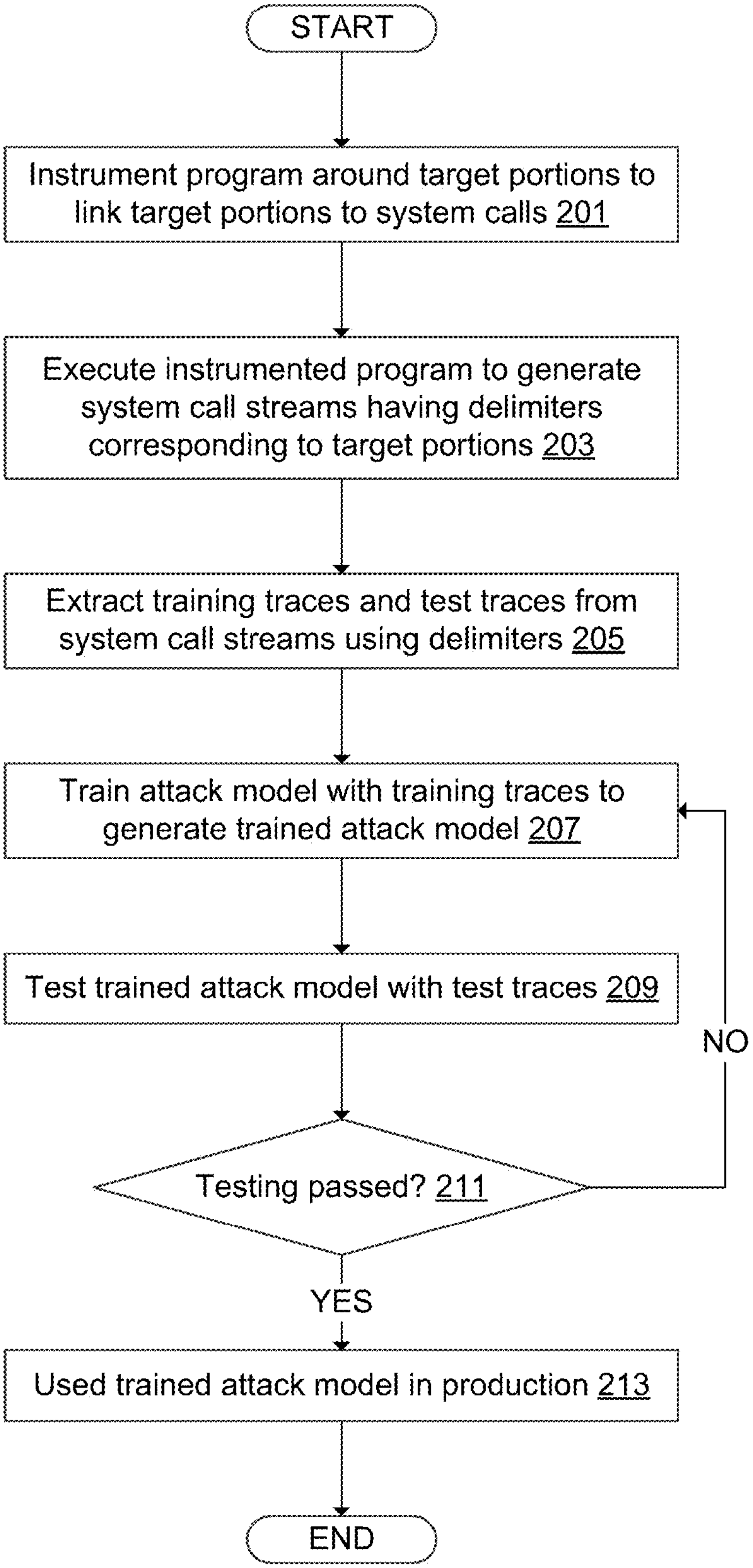
FIG. 2 shows a flowchart for generating an attack model in accordance with one or more embodiments.

FIG. 2 shows a flowchart for generating an attack model in accordance with one or more embodiments. In Block 201, a target program is instrumented around the target portions to link the target portions to the system calls. In one or more embodiments, the instrumentation is added on at the start and end of the target portion of the program. Adding the instrumentation may be performed automatically or by a computer. Adding instrumentation includes adding instructions with system calls to the target program that cause adding delimiters to the system call stream. Because of the differences between user space and kernel space and the system call stream is a kernel level log, the instrumentation does not directly request the kernel to write to the system call stream. Rather, the instrumentation includes system call instructions by a particular delimiter. The system call instructions that are added through instrumentation cause the kernel to write the delimiter in the system call stream. For example, the delimiter may be added as the type of system call or as requesting the system call instruction. In order to avoid modifying memory besides the system call stream, the system call instruction may be a read instruction, such as to read from an object.

In Block 203, the instrumented program is executed to generate a system call stream having delimiters corresponding to the targeted portion. In one or more embodiments, the instrumented program is executed in a benign environment. For example, the instrumented program may be executed under a variety of test scenarios. During execution, the processor executes a system call in the instrumented program. The system call is processed by the kernel. A probe may record information about the system call as part of the system call stream to the buffer. The monitor may then take the system call stream and store the system call stream. The execution of the target program may be performed multiple times for a variety of scenarios to generate a variety of system call traces.

In Block 205, training traces and test traces are extracted from the system call stream using delimiters. The delimiters are used to identify the start and end of a traces in the system call stream. Namely, the system call stream may be parsed starting at the beginning until a delimiter is identified. The subsequent system call identifiers after the delimiter are added to the trace in order until another ending delimiter is identified. When the ending delimiter is identified, the trace is stored. The process is continued for the system call stream and then repeated for each system call stream until the traces are extracted. The traces may be partitioned into a training group and a test group. The partitioning may be random or based on predefined criteria. For example, the training group of training traces may be from benign executions of the instrumented program. The test group of test traces may be a mixture of the benign executions and executions from attacks.

In Block 207, an attack model is trained with the training traces to generate a trained attack model. For an attack model that is a Markov Chain model, the training may be performed as described in FIG. 3. The training of other types of attack models may be performed according to the type of attack model. The labels of the attack model may be used to update the attack model.

In Block 209, the trained attack model is tested with test traces. The testing compares the predicted labels to the predefined labels to determine the accuracy of the model. In Block 211, a determination is made whether testing passed. Testing passes when the accuracy level matches a predefined accuracy level. For example, the testing may be determining whether the number of false alerts is less than a first threshold and a number of attack traces are less than a second threshold. If testing does not pass, the flow returns back to training in Block 207. If testing passes, the flow proceeds to Block 213.

In Block 213, the trained attack model is used in production. Specifically, the trained attack model may be used with unlabeled traces to detect attacks that exploit the instrumented program. Using the trained attack model in production is performed according to FIG. 5.

Figure 3:
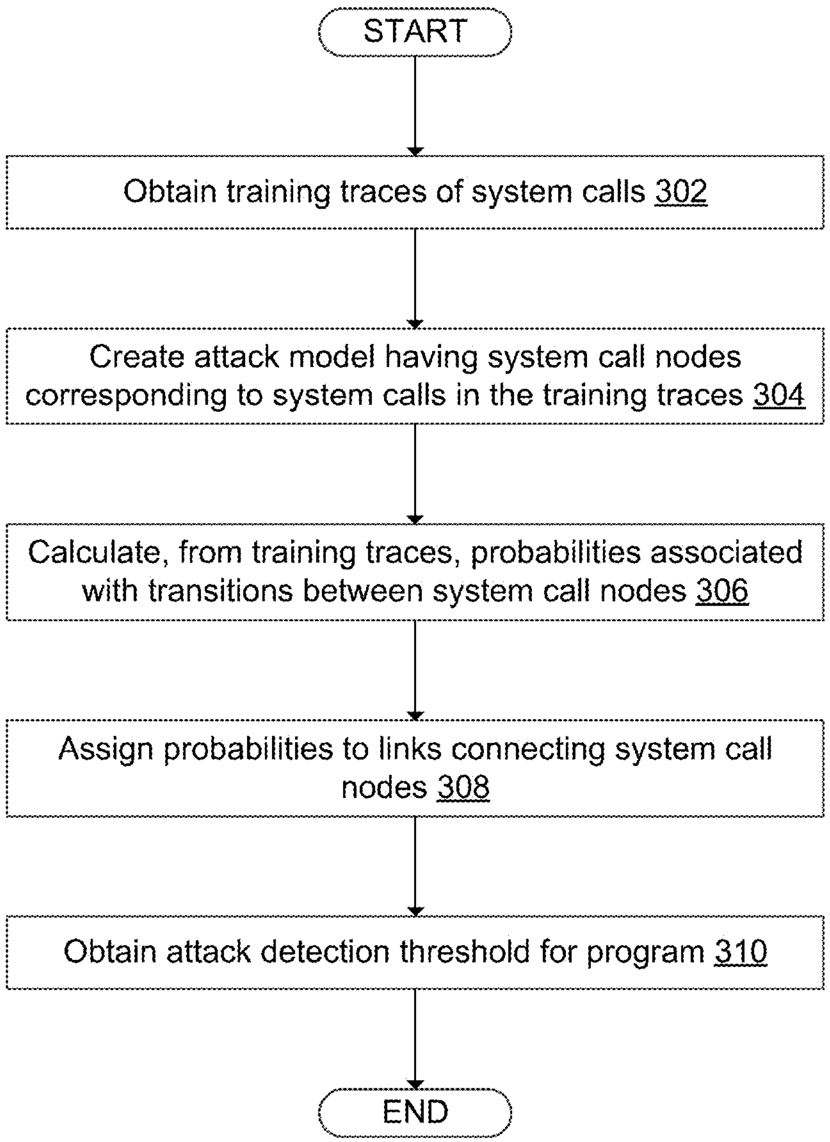
FIG. 3 shows a flowchart for generating an attack model that is a Markov Chain model in accordance with one or more embodiments.

FIG. 3 shows a flowchart for generating an attack model that is a Markov Chain model in accordance with one or more embodiments. In Block 302, training traces of system calls are obtained. Obtaining the training traces may be from the data repository. In some embodiments, the training traces that are obtained are the subset of traces that are for a particular portion of the program for which the attack model is being generated.

In Block 304, an attack model is created having system call nodes corresponding to the system calls identified in the training traces. In one or more embodiments, a unique system call node may be created for each type of system call identified in a training trace. The system call nodes are linked by a directed edge (i.e., a stored reference or implied link based on the position) based on the transition order of the corresponding system calls. For example, a link from a first system call node to a second system call node may exist if and only if, in at least one trace, an identifier of the first system call node immediately precedes the identifier of the second system call. In the example, the first system call node is for the first system call node and the second system call node is for the second system call. Thus, system call nodes are connected to match the order of system calls in the traces.

In Block 306, from the training traces, probabilities associated with transitions between the system call nodes are determined. Because different sequences of system calls exist, the same system call node may link from multiple preceding system call nodes and to multiple subsequent system call nodes. From the traces, a determination may be made for each link from a preceding system call node to a succeeding system call node, the percentage of transitions to the succeeding system call node as compared to the total number of times that the traces include the preceding system call.

In Block 308, the probabilities are assigned to the links connecting the system call nodes. The probability of each transition (i.e., a system call of the preceding system call node immediately, in a trace, having a subsequent system call) is stored as an attribute of the link.

By way of an example, consider the scenario in which system call of type A is referenced forty times. Of the forty times, the next system call is a system call of type B twenty times, system call of type C ten times, and system call of type D ten times. Thus, for twenty out of forty times or fifty percent of the time, a transition is from system call type A to type B. For ten out of forty times or twenty five percent of the time, a transition is from system call type A to type C. Likewise, for ten out of forty times or twenty five percent of the time, a transition is from system call type A to type D. Thus, in the attack model, the edge from the system call type A node to system call type B node has a stored attribute of fifty percent, while the remaining two edges have a stored attribute of twenty five percent.

Continuing with FIG. 3, in Block 310, an attack detection threshold is obtained. The attack detection threshold may be a fixed threshold or may be a dynamic threshold. A fixed threshold assigns a fixed value to detecting attacks. For example, if the probability of transitioning between system calls as defined by the attack model is less than the threshold, an attack may be detected.

Figure 4:
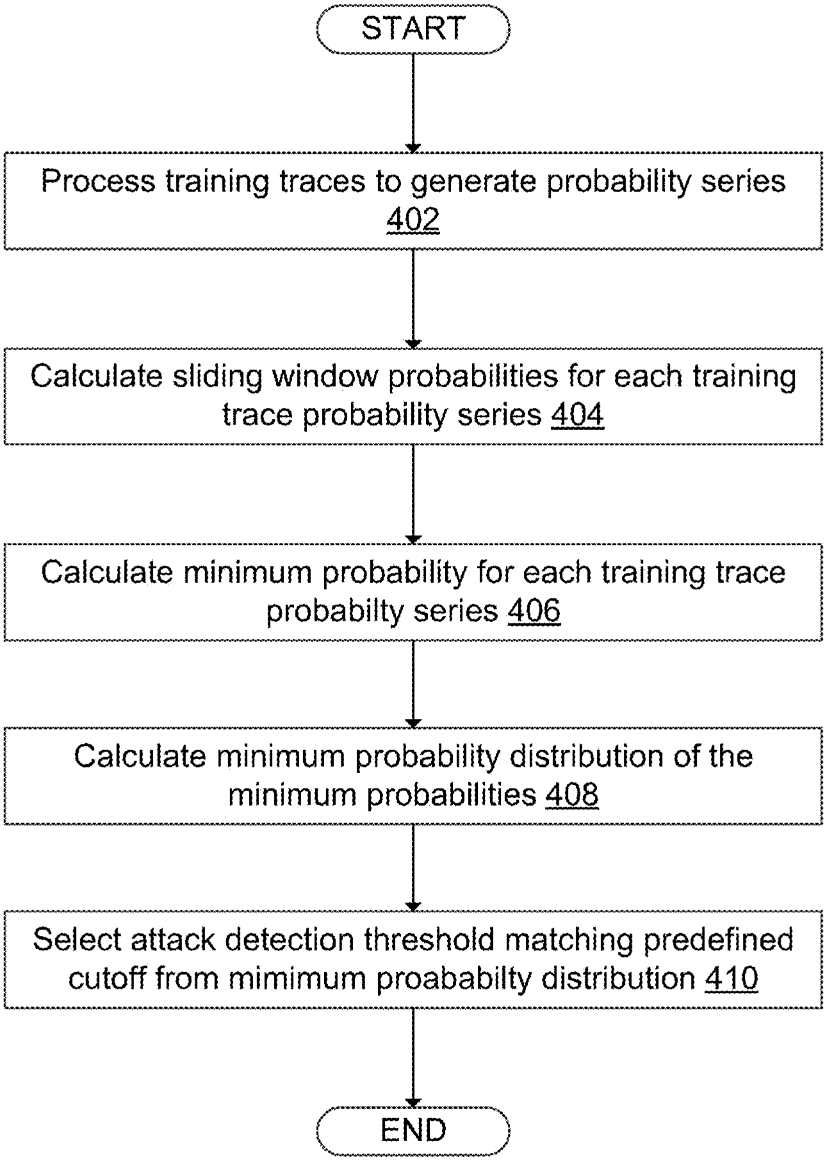
FIG. 4 shows a flowchart for generating an attack detection threshold in accordance with one or more embodiments.

FIG. 4 shows a flowchart for generating an attack detection threshold for a particular attack model in accordance with one or more embodiments. In Block 402, training traces are processed to generate a probability series. For each training trace, a series of probabilities of each transition is recorded in a list of probabilities for the training trace. For a Markov Model, the attack graph is traversed in the order defined by the system calls recorded in the trace. During the traversal, each probability stored as an attribute of a link being traversed is recorded in a list for the trace. The result is a series of probabilities in a list. The list is referred to as a trace probability series or training trace probability series when from a training trace.

In Block 404, sliding window probabilities are calculated for each training trace probability series. The size of the sliding window may be configurable. For example, the sliding window may be two or three probabilities. Further, the same or different sizes of probability windows may exist for the different attack models associated with an instrumented program or for different instrumented programs. As the sliding window slides across the trace probability series, a sliding window probability is calculated. Calculating the sliding window probabilities may be performed, for example, by multiplying the probabilities within the sliding window together. For example, if the size of the sliding window is two, then each two probabilities that are adjacent to each other are multiplied together. The result is a set of sliding window probabilities for each training trace.

In Block 406, a minimum probability for each training trace probability series is calculated. The minimum probability is the minimum of each probability series.

In Block 408, a distribution of the minimum probability series is calculated. The distribution is across the training traces.

In Block 410, an attack detection threshold matching a predefined cutoff is selected from the minimum probability distribution. The predefined cutoff is the percentage of training traces that are benign that may be detected as an attack. For example, if the predefined threshold is fifteen percent, then the attack detection threshold is a threshold minimum probability that has fifteen percent of the training traces in the distribution having a minimum probability below the threshold minimum probability. Determining the cutoff value may be performed using a cross-validation study where the ratio is gradually increased from 0.5% to 12% and the F1-score is measured.

Figure 5:
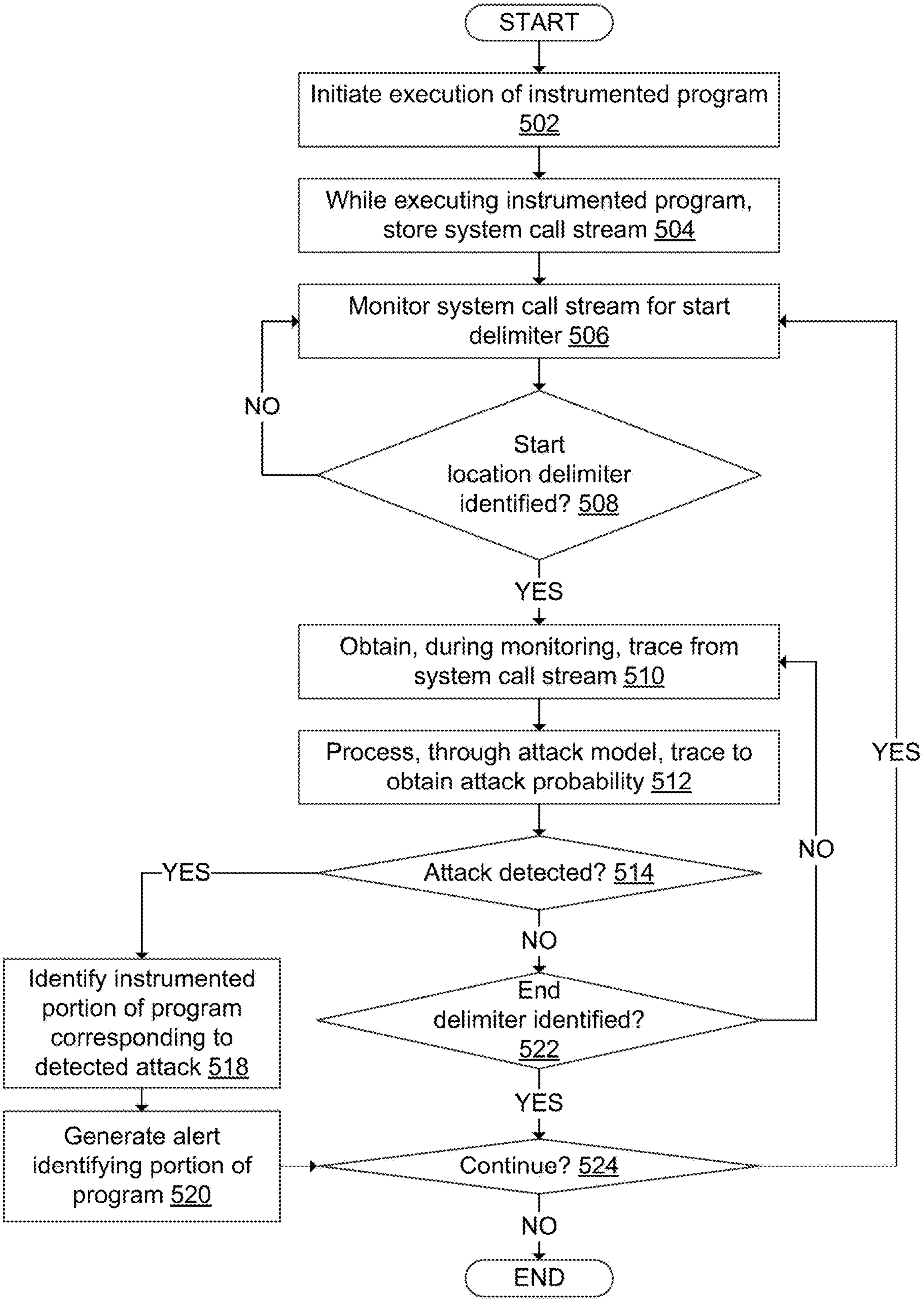
FIG. 5 shows a flowchart for executing an instrumented program and detecting attacks in accordance with one or more embodiments.

FIG. 5 shows a flowchart for executing an instrumented program and detecting attacks in accordance with one or more embodiments. Specifically, FIG. 5 shows a flowchart for detecting attacks involving an instrumented program while an instrumented program is executing. In one or more embodiments, the attack detection is performed in real time.

Turning to FIG. 5, in Block 502, execution of the instrumented program is initiated. For example, an instance of the instrumented program starts executing on the computing system.

While executing the instrumented program, a system call stream is stored in Block 504. For example, a system call is made to the kernel. The probe detects the system call and adds metadata about the system call to the buffer. The monitor obtains the system call from the buffer and sends the system call to the attack detector.

In Block 506, the system call stream is monitored for a start location delimiter. Each system call recorded in the system call stream is checked in order whether the system call is for the delimiter. In Block 508, a determination is made whether the system call is for a delimiter. If the system call is not for a delimiter, the flow returns to Block 506 to continue monitoring. If the system call is for a delimiter, the flow continues with Block 510. In Block 510, a trace from the system call stream is obtained.

In Block 512, the trace is processed through the attack model to obtain an attack probability. In some embodiments, the processing is performed while the trace is being obtained. For example, as the system calls of the trace are being received, the system calls may be processed through the attack model to identify a corresponding probability of transition. The probabilities within a sliding window may be used to generate a sliding window probability as described in FIG. 4. The sliding window probability may be compared to the attack detection threshold to detect an attack. As new system calls are processed, the sliding window of system calls is moved to include the next new system call. Other methods for processing the trace may be performed.

In Block 514, a determination is made whether an attack is detected. For example, the probability generated by the attack model is compared to the attack detection threshold. If the probability of attack is greater than the attack detection threshold, then an attack is detected. If the probability is less than the attack detection threshold, then the attack is not detected and the flow proceeds to Block 522. In Block 522, a determination is made whether an end delimiter is identified. If an end delimiter is not identified, the processing continues with Block 510 to continue monitoring the system call trace. If the end delimiter is identified, a determination is made whether to continue in Block 524. The determination is made to continue if additional instructions exist to execute. If the determination is made to continue, the flow proceeds to Block 506 to determine whether another start delimiter exists. Otherwise, the flow may proceed to end.

Returning to Block 514, using the trace, an attack may be detected. If an attack is detected, an instrumented portion of the program corresponding to the detected attack is identified in Block 518. Metadata from the trace in the system stream may be used to identify the instrumented portion of the program. For example, the type of system call may be a unique identifier associated with the portion of the program. In such a scenario, the portion of the program may be determined from the type of system call. Further, the process identifier performing the system call may be linked to the requests to the program using log files. By gathering the data from a variety of data sources, information about the attack is identified. An alert may be generated that identifies portions of the program in Block 520. The alert may be stored, transmitted to an administrator user, or transmitted to other processes that are configured to automatically stop the attack. Because of the linkage with portions of the program through instrumenting system calls and adding delimiters to system call stream, the vulnerable parts of the program may be identified. Accordingly, a patch may be created that fixes the vulnerability in the program. Thus, one or more embodiments may increase the security of the overall system by real-time or offline attack detection.

FIG. 6A, FIG. 6B, FIG. 6C, FIG. 6D, and FIG. 6E show an example in accordance with one or more embodiments. The following example is for explanatory purposes only and not intended to limit the scope of the invention.

Figure 6A:
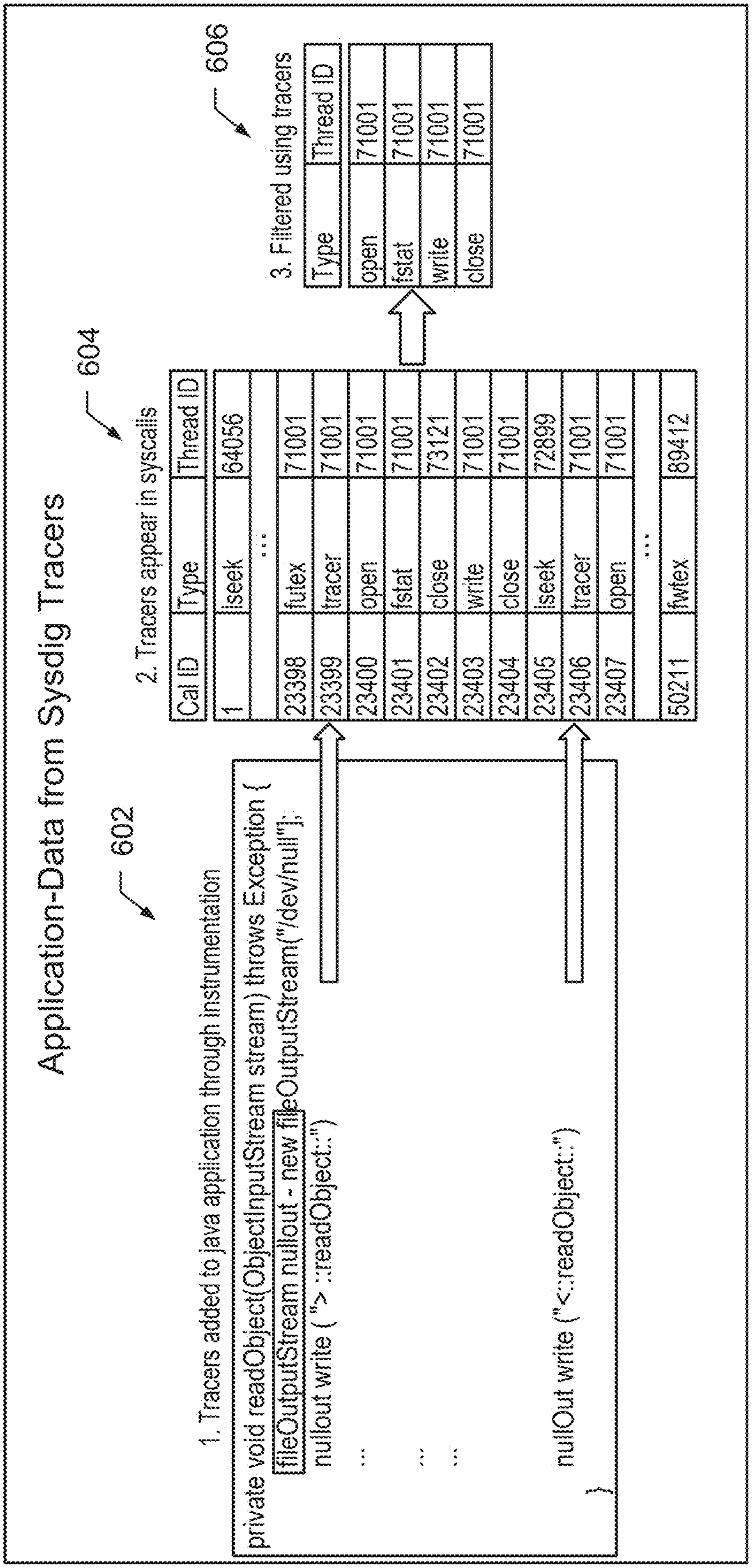
FIG. 6A, FIG. 6B, FIG. 6C, FIG. 6D, and FIG. 6E show an example in accordance with one or more embodiments.

FIG. 6A shows an example of instrumentation (602) causing delimiters to be added to the system call stream (604), which may be used to extract a trace (606) from the system call stream (604).

In the example of FIG. 6A, the instrumentation (602) adds code around a method of interest. Specifically, the instrumentation reads an object from null out. The reading is a system call that adds delimiters (i.e., type tracer) to the system call stream. In 602, the code that is being instrumented is the code of the application being secured and is in between the nullout. The instrumentation code are the lines that write ">::readObject::" and "<::readObject::" to /ev/null. The example shows an implementation using SYSDIG® probe developed by Sysdig, Inc. When the SYSDIG® probe detects a system call that writes a string surrounded with ">:: ::" to /ev/null, the SYSDIG® probe converts the system call to a "tracer" entry. As shown, one or more embodiments use the tracer entry as a delimiter to communicate information from the application to the syscall stream.

In the system call stream (604), each system call is recorded. The recording includes the call identifier (i.e., Call ID), a type, and a thread identifier (i.e., Thread ID). The call identifier is a unique identifier of the particular system call. The type is the type of system call. The thread identifier is an identifier of the thread requesting the system call. As shown, the "tracer" as the type of system call is a start and end delimiter for a portion of the program of interest. Using the delimiter, a trace (606) is extracted, whereby each system call listed in the trace has the same thread identifier and is performed between the starting and ending delimiter. The result is a trace (606).

Figure 6B:
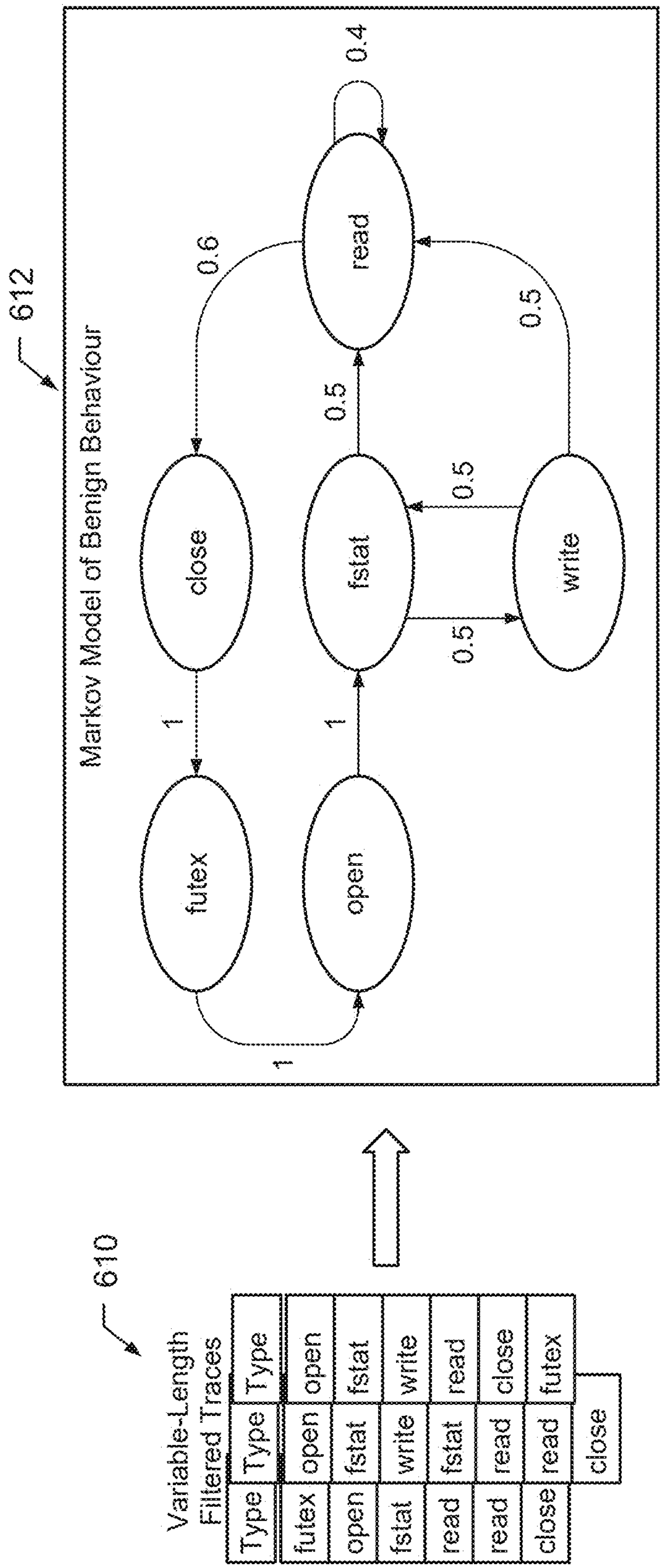

FIG. 6B shows an example of generating a Markov Model (612) from the test traces (610). Specifically, the system call types in the variable length test traces (610) are used to determine the system call nodes in the Markov model. The probability, as determined from the test traces of each transition is added as a stored attribute to the Markov Model data structure (612). The result is a Markov model data structure that is specific to the portion of the instrumented program.

Figure 6C:
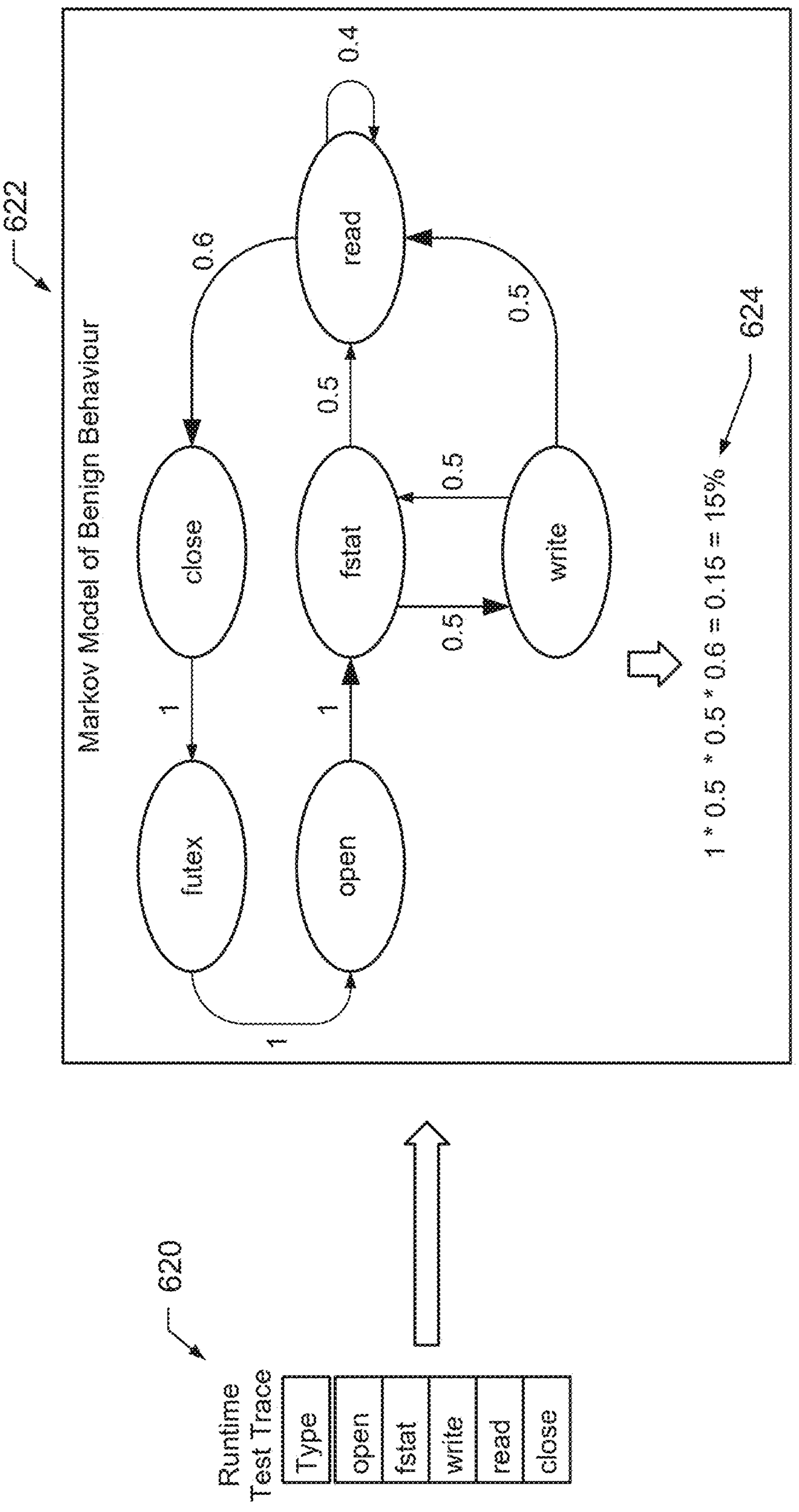

FIG. 6C shows an example of traversing the generated Markov Chain model (622) according to the test trace (620) to generate a probability series. As shown, the traversal is in order of the test trace (620). Thus, the path starts with open, moves to fstat with a probability of 1, then to write with a probability of 0.5, then to read with a probability of 0.5, and finally to close with a probability of 0.6. The probability series (624) lists the results probabilities. If the sliding window is the entire trace, the probability of the path is 15%. Multiplying each of the probabilities together in the entire model may cause a short malicious trace to be benign and the long trace to be malicious. Thus, a sliding window probability may be used.

Figure 6D:
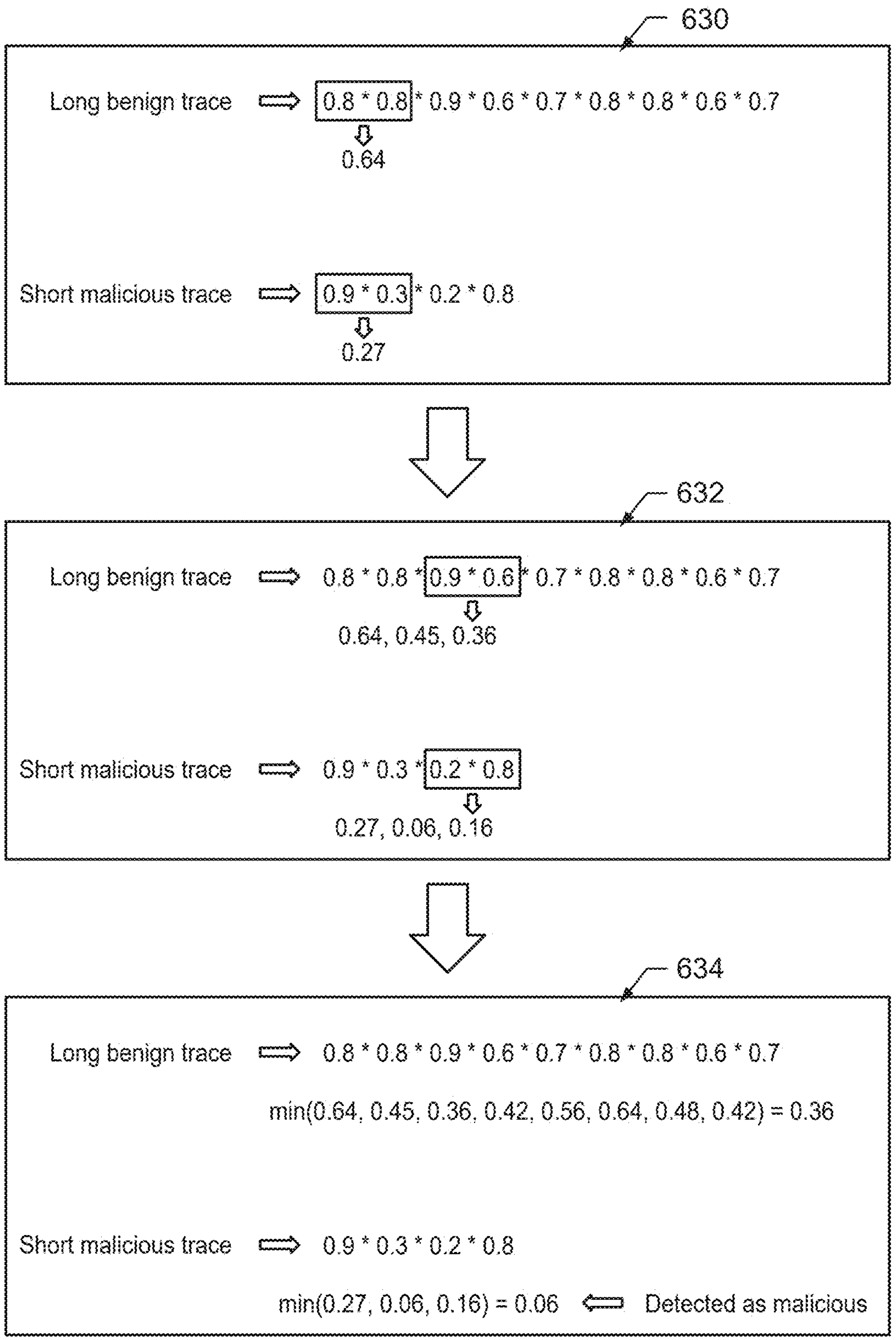

FIG. 6D shows an example of using a sliding window to generate a set of sliding window probabilities. In the example, the sliding window is of size two. The sliding window serves to identify the probability of a chain of transitions according to the size of the sliding window. Thus, as shown in time 1 (630) and time 2 (632), the sliding window slides across the probability series to generate a sliding window probability. Taking a minimum of the sliding window probabilities for each respective trace causes the long trace to be correctly identified as benign and the short trace to be listed as malicious as shown in block (634). Whether a trace is benign or malicious is determined based on a comparison to an attack detection threshold.

Figure 6E:
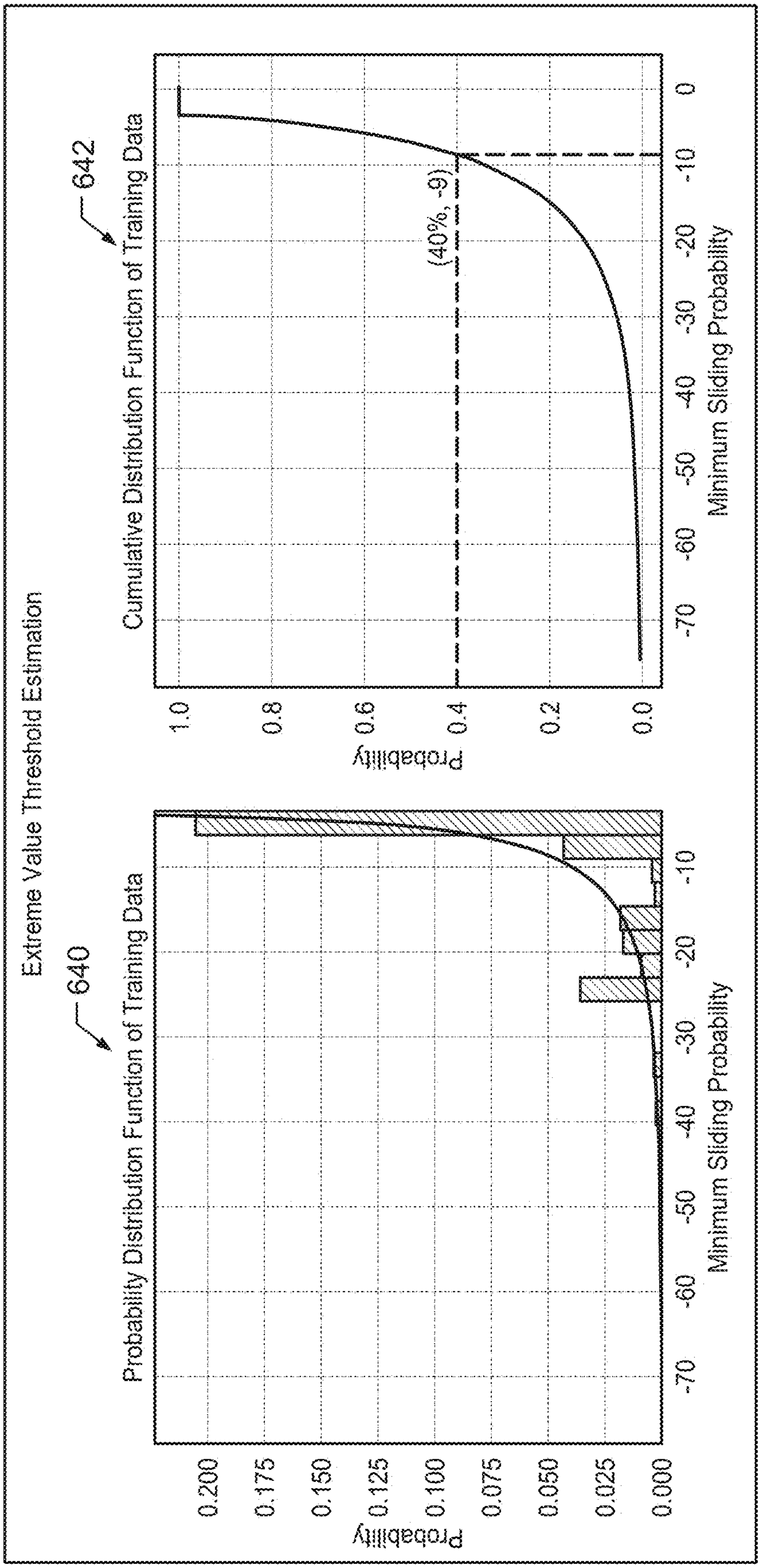

FIG. 6E shows an example for generating the attack detection threshold. In the example, graphs (640, 642) are shown. The graphs use the log probabilities for sliding window probability on the horizontal axis. For example, −9 on the horizontal axis of the graph is the value of $10^{-9}$ for the sliding window probability. The test traces are processed through the attack model as described in FIGS. 6C and 6D to generate a minimum probability. A distribution is created from a histogram of the minimum probabilities as shown in graph (640). The graph (642) shows the distribution with the cutoff value of 40% demarcated. Using the cutoff value, the attack detection threshold is set at −0.9.

Using the above process, the computing system may be monitored during execution for attacks. Specifically, when a delimiter is detected in the system call stream, the trace is extracted. While the trace is extracted, system calls may be processed by the attack model to generate probabilities. As new probabilities are determined, a sliding window slides across the probabilities in the probability series to calculating a sliding window probability. The sliding window probability may be compared to the attack detection threshold to detect an attack. If an attack is detected, the attack may be immediately stopped and effectively secure the computing system.

Figure 7A:
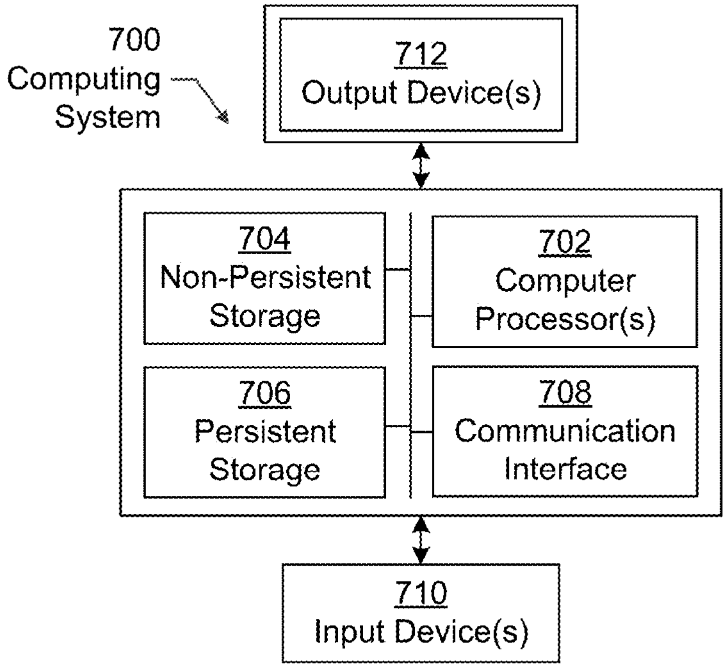
FIG. 7A and FIG. 7B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (712). The inputs may include text input, audio input, video input, etc., which may be processed and transmitted by the computing system (700) in accordance with the disclosure. The communication interface (708) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (712) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 7B:
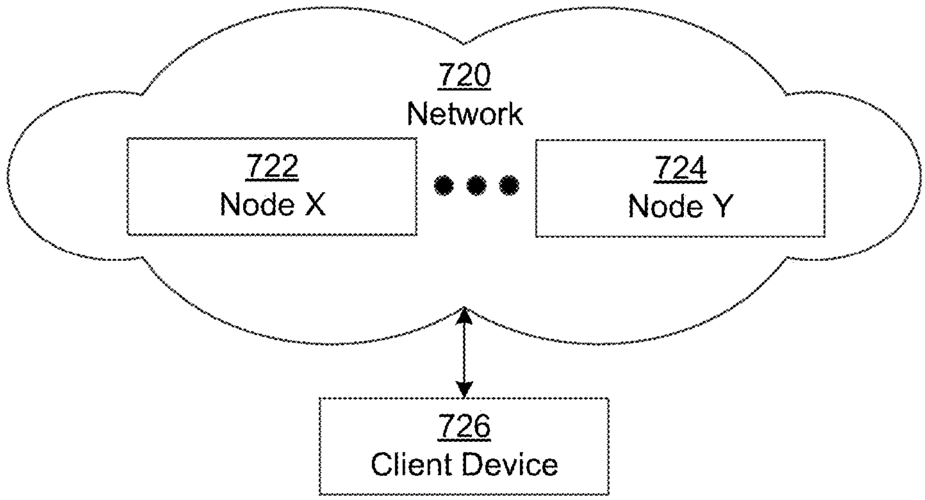

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

instrumenting a target program around a target portion of the target program to link the target portion to a plurality of system calls in the target portion, wherein instrumenting the target program creates an instrumented program with an instrumented portion;

executing the instrumented program to generate a plurality of system call streams having a plurality of delimiters corresponding to the target portion;

extracting a plurality of training traces and a plurality of test traces from the plurality of system call streams using the plurality of delimiters;

training an attack model with the plurality of training traces to generate a trained attack model;

obtaining a system call stream from executing the instrumented program comprising the instrumented portion, wherein the instrumented portion comprises instrumentation to add a start delimiter;

monitoring the system call stream for the start delimiter defined by instrumentation in the instrumented program;

extracting a system call trace starting at the start delimiter;

processing the system call trace through the trained attack model to obtain an attack probability;

detecting an attack based on a comparison of the attack probability with an attack detection threshold; and generating an alert identifying the attack and the instrumented portion.

2. The method of claim 1, wherein detecting an attack is performed in real time while the instrumented program is executing.

3. The method of claim 1, further comprising:

receiving the system call stream by a kernel executing in kernel space;

adding, by a probe executing in the kernel space, the plurality of system calls as the system call stream to a buffer; and obtaining, by a monitor executing in user space, the system call stream from the buffer, wherein the system call stream is obtained by an attack detector from the monitor.

4. The method of claim 1, further comprising:

testing the attack model with the plurality of test traces.

5. The method of claim 1, wherein processing the system call trace through the trained attack model comprises:

traversing a plurality of system call nodes in the trained attack model according to an order defined by the plurality of system calls in the system call trace to obtain a probability series for the system call trace; and determining the attack probability from the probability series.

6. The method of claim 5, further comprising:

calculating a set of sliding window probabilities from the probability series; and calculating a minimum probability of the set of sliding window probabilities, wherein the minimum probability is the attack probability.

7. A method comprising:

processing a plurality of training traces to generate a plurality of training trace probability series;

calculating a plurality of sliding window probabilities from the plurality of training trace probability series;

calculating a plurality of minimum probabilities from the plurality of sliding window probabilities;

calculating a minimum probability distribution of the plurality of minimum probabilities;

selecting, from the minimum probability distribution, an attack detection threshold matching a predefined cutoff;

obtaining a system call stream from executing an instrumented program comprising an instrumented portion, wherein the instrumented portion comprises instrumentation to add;

monitoring the system call stream for a start delimiter defined by instrumentation in the instrumented program;

extracting a system call trace starting at the start delimiter;

processing the system call trace through an attack model to obtain an attack probability;

detecting an attack based on a comparison of the attack probability with the attack detection threshold; and generating an alert identifying the attack and the instrumented portion.

8. The method of claim 1, wherein the system call trace only identifies system calls.

9. The method of claim 1, wherein extracting the system call trace comprises extracting a system call metadata of system calls between the start delimiter and an end delimiter and having a same thread identifier as the start delimiter.

10. A system comprising:

at least one processor; and instructions executing on the at least one processor to cause the at least one processor to perform operations comprising:

processing a plurality of training traces to generate a plurality of training trace probability series, calculating a plurality of sliding window probabilities from the plurality of training trace probability series, calculating a plurality of minimum probabilities from the plurality of sliding window probabilities, calculating a minimum probability distribution of the plurality of minimum probabilities, selecting, from the minimum probability distribution, an attack detection threshold matching a predefined cutoff, obtaining a system call stream from executing an instrumented program comprising an instrumented portion, wherein the instrumented portion comprises instrumentation to add, monitoring the system call stream for a start delimiter defined by instrumentation in the instrumented program, extracting a system call trace starting at the start delimiter, processing the system call trace through an attack model to obtain an attack probability, detecting an attack based on a comparison of the attack probability with the attack detection threshold, and generating an alert identifying the attack and the instrumented portion.

11. The system of claim 10, wherein detecting an attack is performed in real time while the instrumented program is executing.

12. The system of claim 10, wherein processing the system call trace through the attack model comprises:

traversing a plurality of system call nodes in the attack model according to an order defined by a plurality of system calls in the system call trace to obtain a probability series for the system call trace, and determining the attack probability from the probability series.

13. The system of claim 12, wherein the operations further comprise:

calculating a set of sliding window probabilities from the probability series; and calculating a minimum probability of the set of sliding window probabilities, wherein the minimum probability is the attack probability.

14. The system of claim 10, wherein the operations further comprise:

instrumenting a target program around a target portion of the target program to link the target portion to a plurality of system calls in the target portion, wherein instrumenting the target program creates the instrumented program with the instrumented portion;

executing the instrumented program to generate a plurality of system call streams having a plurality of delimiters corresponding to the target portion;

extracting the plurality of training traces and a plurality of test traces from the plurality of system call streams using the plurality of delimiters; and training the attack model with the plurality of training traces to generate a trained attack model, wherein the trained attack model is used to process the system call trace.

15. The system of claim 10, wherein the system call trace only identifies system calls.

16. The system of claim 10, wherein extracting the system call trace comprises extracting a system call metadata of system calls between the start delimiter and an end delimiter and having a same thread identifier as the start delimiter.

17. A non-transitory computer readable storage medium comprising computer readable program code for causing a computing system to perform operations comprising:

instrumenting a target program around a target portion of the target program to link the target portion to a plurality of system calls in the target portion, wherein instrumenting the target program creates an instrumented program with an instrumented portion;

executing the instrumented program to generate a plurality of system call streams having a plurality of delimiters corresponding to the target portion;

extracting a plurality of training traces and a plurality of test traces from the plurality of system call streams using the plurality of delimiters;

training an attack model with the plurality of training traces to generate a trained attack model;

obtaining a system call stream from executing the instrumented program comprising the instrumented portion, wherein the instrumented portion comprises instrumentation to add a start delimiter;

monitoring the system call stream for the start delimiter defined by instrumentation in the instrumented program;

extracting a system call trace starting at the start delimiter;

processing the system call trace through the trained attack model to obtain an attack probability;

detecting an attack based on a comparison of the attack probability with an attack detection threshold; and generating an alert identifying the attack and the instrumented portion.

18. The non-transitory computer readable storage medium of claim 17, wherein detecting an attack is performed in real time while the instrumented program is executing.

* * * * *